United States Patent [19]

Urataki et al.

[11] 4,353,727

[45] Oct. 12, 1982

[54] METHOD FOR FABRICATING FLUORESCENT LAMP

[75] Inventors: Etsuo Urataki; Yoshio Takano; Yoshinobu Tomita; Mitsuru Nakagawa, all of Ohme, Japan

[73] Assignee: Hitachi, Ltd., Tokyo, Japan

[21] Appl. No.: 286,067

[22] Filed: Jul. 23, 1981

[30] Foreign Application Priority Data

Jul. 23, 1980 [JP] Japan .................................. 55-99919

[51] Int. Cl.³ .............................................. C03D 23/20

[52] U.S. Cl. ........................................... 65/36; 65/42; 65/60.7

[58] Field of Search ................. 65/36, 42, 41, 57, 60.7

[56] References Cited

U.S. PATENT DOCUMENTS 2,215,644 9/1940 Hays .................................. 65/32 X 2,449,637 9/1948 Blake et al. ......................... 65/42 X 3,932,164 1/1976 Gebhardt ............................ 65/36 X

*Primary Examiner*—Robert L. Lindsay, Jr.

*Attorney, Agent, or Firm*—Craig and Antonelli

[57] ABSTRACT

A mount having a flared portion is so located that it is coaxial with a straight glass tube having an unconstricted end part and that an end face of the flared portion lies slightly inwards with respect to an end face of the glass tube. Subsequently, an outer surface of the end part of the glass tube is uniformly heated, whereby the flared portion and the end part of the glass tube are melted and stuck to each other. At this time, a surface temperature of the whole glass tube except the melted and stuck portion is maintained at or above 40° C. As a result, a fluorescent lamp having good lamp characteristics is fabricated by the use of the inexpensive glass tube.

4 Claims, 10 Drawing Figures

METHOD FOR FABRICATING FLUORESCENT LAMP

BACKGROUND OF THE INVENTION

This invention relates to a method for fabricating a fluorescent lamp, and more particularly to improvements in a mount sealing process for a fluorescent lamp.

In general, a fluorescent lamp is finished up via a process for spreading a phosphor on the inner surface of a glass tube, a process for baking the phosphor, a process for sealing each end part of the glass tube by the use of a mount, a process for exhausting the air from the glass tube, a base attaching process, and an aging process.

In the sealing process among these fabricating processes, each end of the glass tube is melted and sealed with the mount having a filament. A typical prior-art example of such sealing process will be described with reference to FIGS. 1A, 1B and 1C.

(a): First, a straight glass tube 3 is held vertical, and a mount pin 1 carrying a mount 2 is inserted into the glass tube 3. At this time, the flared edge 5 of the mount 2 is located at that position inside the glass tube 3 which is considerably higher than the extremity 7 of the glass tube 3. Whilst rotating the glass tube 3 round its axis with the mount and the glass tube kept in such positional relationship, a burner (not shown) is applied to a position of arrows A and A corresponding substantially to the flared edge 5 of the mount 2 (FIG. 1A).

(b): Then, the part of the glass tube 3 heated by the burner softens and thins to melt and adhere to the flared edge 5 of the mount 2. A cullet 4 which is the lower end part of the glass tube 3 moves down owing to its own weight (FIG. 1B).

(c): By further heating the vicinity B of the melted part of the glass tube 3 as indicated by arrows, the cullet 4 separates, and the sealing of the tube end 6 is completed (FIG. 1C).

The sealing process called the "drop sealing" as illustrated in FIGS. 1A, 1B and 1C has many problems. For example, the cullet 4 in the glass tube 3 becomes wasteful in production, with the result that the material cost becomes high. Moreover, an equipment for the abandonment disposal of the cullet 4 needs to be arranged in production installations.

Another typical prior-art example of the sealing process will now be explained with reference to FIG. 2.

In the case of the figure, the end part 8 of a glass tube 3 is formed into a neck shape and is located in proximity to the flared edge 5 of a mount 2 carried on a mount pin 1. Whilst heating the connected parts A by means of a burner (not shown), they are melted to seal the tube end.

The sealing process called the "butt sealing" as illustrated in FIG. 2 has many problems, too. For example, the end part 8 of the glass tube 3 needs to be formed into the neck shape in advance, so that the price of the glass tube 3 rises. Especially in case where the outside diameter of the glass tube 3 is small, the formation of the neck shape is not easy.

SUMMARY OF THE INVENTION

In view of the problems of the prior arts stated above, this invention has for its object to provide a novel method for fabricating a fluorescent lamp as eliminates the problems.

In order to accomplish the object, according to this invention, a mount having a flared portion is first located coaxially with a straight glass tube having an unconstricted end part in such a manner that the end face of the flared portion lies slightly inwards with respect to the end face of the glass tube. Subsequently, the outer surface of the end part of the glass tube is uniformly heated, whereby the flared portion is melted and stuck to the end part of the glass tube. At this time, the surface temperature of the whole glass tube except the melted and stuck part is maintained at 40° C. or above. Owing to such characterizing method for fabricating a fluorescent lamp, the straight glass tube for which any end form treatment has not been performed at all is permitted to be sealed by the use of the mounts without bringing about any cullet. Moreover, as regards lamp characteristics, the fluorescent lamp produced is not inferior at all to the fluorescent lamp fabricated by the prior-art drop sealing or butt sealing process. Since the straight tube can be used as the glass tube, the material cost thereof becomes low, and since quite no cullet develops, the re-disposal installations therefor become unnecessary. Eventually, the production cost of the fluorescent lamp can be sharply reduced, which is greatly effective.

DETAILED DESCRIPTION

Figure 3A:
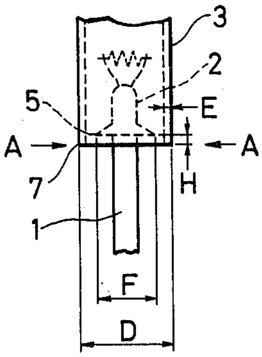
FIGS. 3A and 3B are fragmentary views for explaining a method according to this invention for fabricating a fluorescent lamp.
Figure 3B:
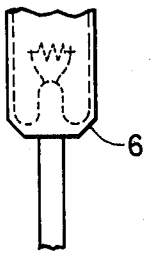

FIGS. 3A and 3B show a concrete embodiment of a method for fabricating a fluorescent lamp according to this invention. The illustrated embodiment is carried out as follows:

(a): First, a mount pin 1 carrying a mount 2 is erected plumb, and the mount 2 is located inside a glass tube 3 so that the end face 5 of the flared portion of the mount 2 may be a slight distance H higher than the end face 7 of the glass tube 3. Thereafter, a burner (not shown) is applied substantially in a direction A in the vicinity of the end face 7 of the glass tube 3. Whilst adjusting the intensity of the burner properly, the mount pin 1 and the glass tube 3 are kept rotated about the axis of the glass tube 3 and heated (FIG. 3A).

(b): Owing to the heating, the end face 7 of the glass tube 3 softens and shrinks inwards and also comes into contact with the end face 5 of the flared portion of the mount 2 beginning to soften. They are melted and stuck to form a melted and stuck part 6 (FIG. 3B). Further, at this time, the intensity of the burner is lowered, and the melted and stuck part 6 is heated at a comparatively low temperature to be annealed. Thus, the thermal intensity of the melted and stuck part 6 after the finishing of the fluorescent lamp can be enhanced more.

Figure 1A:
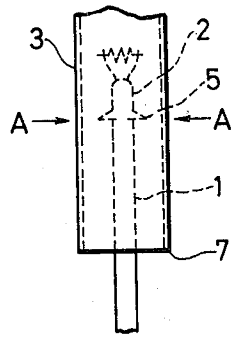
FIG. 1A PRIOR ART
FIGS. 1A, 1B and 1C are fragmentary views for explaining a prior-art method for fabricating a fluorescent lamp.
Figure 1B:
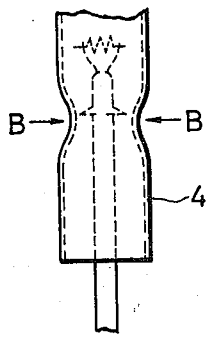
FIG. 1B PRIOR ART
Figure 1C:
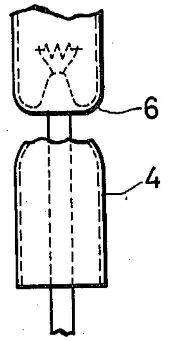
FIG. 1C PRIOR ART

According to the sealing process of this invention as stated above, the following effects can be brought forth:

(i) Since the cullet 4 in the prior-art sealing process shown in FIG. 1C becomes quite unnecessary, the material cost of the glass tube 3 becomes low. Further, the installations and operations for the abandonment disposal of the cullet 4 become unnecessary in the sealing step.

Figure 2:
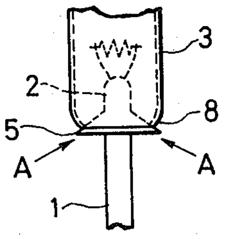
FIG. 2 PRIOR ART
FIG. 2 is a fragmentary view for explaining another prior-art method for fabricating a fluorescent lamp.

(ii) It is unnecessary to form the end part 8 of the glass tube 3 into the neck shape as described in the other prior-art sealing process illustrated in FIG. 2, and the glass tube end may be left in the straight shape. Therefore, the price of the glass tube 3 is very low.

As set forth above, this invention can achieve numerous effects. In this regard, the inventors fabricated lamps via the sealing process according to this invention and investigated various lamp characteristics. As a result, it has been revealed that unless the invention is applied under a certain condition, the lamp characteristics attained cannot endure practical use sufficiently.

The certain condition is that the surface temperature of the whole glass tube 3 except the melted and stuck part is held at, at least, 40° C. in the sealing process of this invention. Otherwise, the lamp characteristics degrade, especially the luminous flux degrades greatly in the initial stage of the lighting of the lamp, and the external appearance of a phosphor yellows. In these respects, the lamp produced is much inferior to the lamps fabricated by the prior-art sealing processes, so that it is difficult to be put into practical use and cannot content the user thereof.

Hereunder, these drawbacks will be described more in detail.

The reason therefor is conjectured as follows. In case of performing the above-stated sealing process according to this invention under the state under which the surface temperature of the glass tube 3 except its part being locally heated by the burner is approximately the normal temperature, a burner gas flow at a high temperature and a heated air flow are cooled by flowing in contact with the inside surface of the glass tube 3 because the burner at the high temperature is locally applied to the part A shown in FIG. 3A. As a result, water droplets adhere to the inner surface of the glass tube 3. Accordingly, the phosphor spread on the inner surface of the glass tube 3 comes to contain the water content. In the succeeding exhausting process, there are conducted the step of evacuating the interior of the lamp tube, the step of energizing filaments to activate a thermionic emitter applied thereon, etc. In this exhausting process, it is sometimes the case that the water content contained in the phosphor is not sufficiently discharged from within the lamp tube. In addition, gases generated from the thermionic emitter during the energization of the filaments bond with the water content. The water content and the bonding materials left in the lamp after its completion will affect the lamp characteristics adversely. Especially as to the luminous flux, there is the drawback that the luminous intensity of the initial stage of lighting decreases greatly due to the lighting for only about 100 hours (hereunder, this decreasing ratio shall be called the "100 hr. lumen decreasing ratio"). On the other hand, there is the disadvantage that the phosphor yellows to conspicuously worsen the external appearance of the lamp.

In order to solve the problems, the inventors conducted many experiments and studies. As a result, it has been found out that when the sealing process of the invention described above is performed while the surface temperature of the glass tube 3 except the melted and stuck part is kept at or above 40° C., the lamp characteristics become equal to those in the prior arts.

Figure 4:
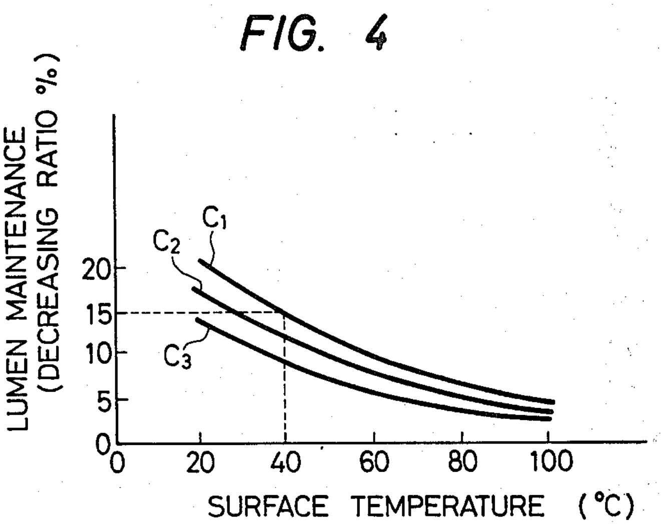
FIG. 4 is a graph showing the relationship between the surface temperature and the lumen maintenance (decreasing ratio)

By making the surface temperature of the whole glass tube 3 at least 40° C., even when the flows of the high temperature have passed inside the glass tube 3 in the sealing process according to this invention as illustrated in FIGS. 3A and 3B, the water content does not adhere to the inner surface of the glass tube 3. Even if it adheres, it is of an amount small enough to be discharged out of the lamp tube in the exhausting process. Therefore, the lumen decreasing ratio and the external appearance equivalent to those in the prior arts are attained. FIG. 4 shows the relationships between the surface temperature of the glass tube 3 in the sealing process according to this invention as described before and the 100 hr. lumen decreasing ratio. In the figure, a curve $C_1$ illustrates a case where the output of the fluorescent lamp is 4 watts, a curve $C_2$ a case where it is 6 watts, and a curve $C_3$ a case where it is 8 watts.

All the curves $C_1$, $C_2$ and $C_3$ demonstrate the tendency that the 100 hr. lumen decreasing ratio lowers gradually as the surface temperature of the glass tube during the sealing rises. It is usually considered that the 100 hr. lumen decreasing ratio may be 15% or below. Then, when the point of intersection between the curve $C_1$ indicative of the characteristic of the 4 W fluorescent lamp and a horizontal line corresponding to a lumen decreasing ratio of 15% is perpendicularly brought down, the surface temperature becomes 40° C. The curve $C_2$ (6 watts) and the curve $C_3$ (8 watts) indicate that if the surface temperature is at least 40° C., the lumen decreasing ratio can be made below 15%.

A fluorescent lamp of high quality requires a lumen decreasing ratio of 5% or below. In order to meet the requirement, as apparent from FIG. 4, it is desired to hold the surface temperature especially at or above 90° C.

Now, there will be described concrete methods for holding the surface temperature of the glass tube 3 at or above 40° C.

Figure 5:
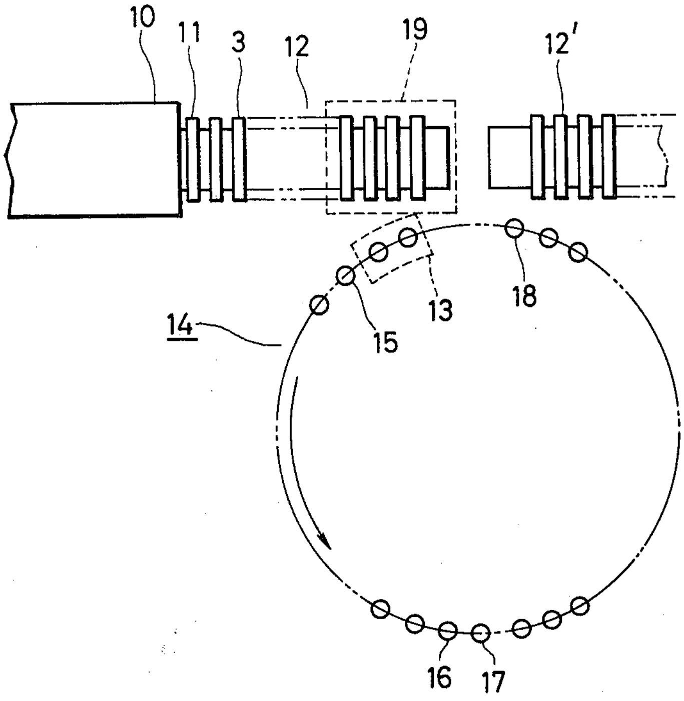
FIG. 5 is a fundamental arrangement plan for explaining a concrete method according to this invention for fabricating a fluorescent lamp.

(1) Method for heating the whole glass tube immediately before the sealing:

As shown in FIG. 5, the glass tube 3 coated with the phosphor passes through a baking furnace 10, whereupon it is moved by a movable conveyor 12 and is sealed by sealing heads 15–16 and 17–18. Herein, before the glass tube reaches the sealing heads, the phosphor at the end part of the glass tube 3 is wiped off a predetermined length. These steps will be described more in detail. The glass tube 3 with the phosphor baked by the baking furnace 10 enters a sealing machine 14 via the movable conveyor 12 (which is provided with a head for removing the phosphor at the tube end part). Numeral 15 designates the first one of the heating heads of the sealing burner, and the sealing of one tube end (end part of the glass tube 3) ends at the head 16. Subsequently, the glass tube 3 is turned by the sealing head for turning 17, and the sealing step of the other tube end is initiated. This sealing ends up at the head 18. Thereafter, the glass tube 3 is transferred to a movable conveyor 12' in order to initiate the exhausting process. In this invention, the surface temperature of the glass tube 3 needs to be held at, at least, 40° C. during the burner heating in the sealing. Therefore, the glass tube 3 is heated with a heating oven or the like in a head position enclosed with a broken line 19 and/or a head position enclosed with a broken line 13. Thus, the temperature of the whole surface of the glass tube 3 can be held at, at least, 40° C. when the glass tube 3 reaches the head 15. At this time, the heating of the glass tube 3 needs to be made over the whole glass tube 3.

In case where the opposite tube end is sealed after turning the glass tube 3 by means of the turning head 17, the whole glass tube 3 has already been heated at the sealing of one end part, and hence, the required surface temperature is held without heating the glass tube 3 again.

(2) Method for holding the necessary surface temperature without using any heating means:

In order to hold the temperature of the whole glass tube 3 during the sealing at or above 40° C. without employing any heating means, the lapse time from a head 11 immediately behind the baking furnace 10 to the head 15 which starts the sealing may be shortened. That is, the number of heads of the movable conveyor 12 is reduced, or the index time of moving the head is shortened. Thus, the glass tube 3 can hold the surface temperature of at least 40° C. owing to residual heat from the baking furnace 10. At the ordinary room temperature, the surface temperature of the glass tube 3 can be held at or above 40° C. by controlling within 3.5 minutes the period of time in which the glass tube 3 comes out of the baking furnace 10 and begins to be sealed.

Examples:

Using the foregoing method for fabricating a fluorescent lamp according to this invention, various fluorescent lamps were produced by setting respective dimensions D, E, F and H indicated in FIG. 3A as listed in Table 1.

TABLE 1

| | Dimensions (mm) | | | |
|---|---|---|---|---|
| Lamp | D | E | F | H |
| 1 | 15.5 | 0.70 | 11.5 | 1 |
| 2 | 30.5 | 1.15 | 23.0 | 1.5 |
| 3 | 25.5 | 0.75 | 19.0 | 2.0 |

Sealing Conditions: Surface temperature of 90° C., Oven heating.

In Table 1, the dimension D represents the outside diameter of the glass tube 3, the dimension E the wall thickness of the glass tube 3, the dimension F the maximum outside diameter of the flared portion of the mount 2, and the dimension H the distance from the end face of the glass tube 3 to the end face 5 of the flared portion of the mount 2. Lamps 1 are fluorescent lamps of 4, 6 and 8 watts, lamp 2 is an annular fluorescent lamp of 30 watts, and lamps 3 are fluorescent lamps of 10 and 15 watts.

As a result, the material cost of the glass tube 3 could be reduced, and the production installations could be simplified owing to the absence of the cullet, so that the fabricating cost of the fluorescent lamp could be curtailed. The lamp characteristics could be made quite equal to those in the prior arts, and the lamp enduring practical use sufficiently and contenting the user could be provided.

Figure 6A:
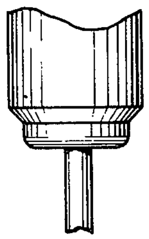
FIGS. 6A and 6B are fragmentary views for explaining the shapes of the sealed parts of fluorescent lamps according to this invention.
Figure 6B:
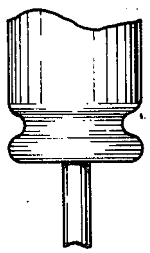

It is of course possible that after the sealing according to this invention, the sealed part 6 (refer to FIG. 3B) is pressed by a mold to be formed into a desired sealing shape. Needless to say, various shapes as shown in FIGS. 6A and 6B can be molded.

Further, this invention is satisfactorily applicable to the sealings of various tubes including incandescent lamps etc.

Moreover, while this invention has been described on the small-sized fluorescent lamps whose tubes have comparatively small volumes, it goes without saying that the invention is not restricted thereto but that it is applicable to fluorescent lamps of great wattage. In addition, this invention is applicable, not only to the case of performing the sealing with the glass tube supported in the vertical direction, but also to a case of performing it with the glass tube supported in the horizontal direction.

Regarding the upper limit of the surface temperature of the glass tube during the sealing, the highest possible temperature is desirable. However, a point of 200° C. is an actual and practicable upper-limit surface temperature when it is taken into account that the 100 hr. lumen decreasing ratio comes to be saturated, that the friction of a portion chucking the glass tube comes to lower, etc. Accordingly, the range of the optimum surface temperatures for fabricating the ordinary fluorescent lamp whose lumen decreasing ratio is suppressed to be 15% or below becomes 40° C.–200° C. Further, the range of the optimum surface temperatures for fabricating the fluorescent lamp of high quality whose lumen decreasing ratio is suppressed to be 5% or below becomes 90° C.–200° C.

As set forth above, the method for fabricating a fluorescent lamp according to this invention makes it possible to use the straight glass tube without any waste and also to fabricate the fluorescent lamp without any degradation of the lamp characteristics. These effects are very excellent.

We claim:

1. In a method for sealing both end parts of a glass tube by the use of mounts; a method for fabricating a fluorescent lamp comprising the step of holding the mount inside said glass tube under a state under which a center axis of said mount having a flared portion coincides with a center axis of the straight glass tube having the unconstricted end part and under which an end face of said flared portion lies slightly inwards with respect to an end face of said glass tube, and the step of uniformly heating an outer surface of said end part of said glass tube while maintaining the surface temperature of the whose glass tube at a temperature which is sufficient to prevent water droplets to adhere to the inner surface of the glass tube, thereby to melt said flared portion and said end part of said glass tube and to stick them to each other.

2. A method for fabricating a fluorescent lamp according to claim 1, further comprising after the melting and sticking step, the step of annealing the melted and stuck portion and the step of molding said melted and stuck portion.

3. A method for fabricating a fluorescent lamp according to claim 1, wherein in the melting and sticking step, the whole surface temperature falls within a range of 40° C. to 200° C.

4. A method for fabricating a fluorescent lamp according to claim 3, wherein in said melting and sticking step, said whole surface temperature falls within a range of 90° C. to 200° C.

* * * * *